US 6,856,585 B2

(12) United States Patent
Stan et al.

(10) Patent No.: US 6,856,585 B2
(45) Date of Patent: Feb. 15, 2005

(54) METHOD AND DEVICE FOR RECORDING INFORMATION IN UNITS

(75) Inventors: Gheorghe Sorin Stan, Eindhoven (NL); Robert Albertus Brondijk, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 471 days.

(21) Appl. No.: 09/940,038

(22) Filed: Aug. 27, 2001

(65) Prior Publication Data

US 2002/0044510 A1 Apr. 18, 2002

(30) Foreign Application Priority Data

Oct. 12, 2000 (EP) .......................................... 00203550

(51) Int. Cl.⁷ .......................... G11B 7/00; G11B 27/02
(52) U.S. Cl. .......................... 369/47.13; 369/47.15; 369/47.27; 369/47.1; 369/53.23; 369/59.23; 369/275.3
(58) Field of Search ............................. 369/47.1, 47.13, 369/47.15, 47.12, 47.19, 47.23, 53.31, 275.3, 47.21, 47.22, 53.35, 53.36, 59.25, 59.26

(56) References Cited

U.S. PATENT DOCUMENTS

| | | | |
|---|---|---|---|
| 5,187,699 A | | 2/1993 | Raaymakers et al. ......... 369/48 |
| 5,222,086 A | * | 6/1993 | Fujita ........................ 714/756 |
| 5,463,607 A | | 10/1995 | Roth et al. ..................... 369/60 |
| 6,118,741 A | * | 9/2000 | Mimnagh et al. ......... 369/59.25 |
| 6,252,838 B1 | * | 6/2001 | Kuroda et al. ............ 369/47.28 |
| 6,628,583 B1 | * | 9/2003 | Van Den Enden et al. ...... 369/47.27 |
| 6,628,584 B1 | * | 9/2003 | Heemskerk et al. ........ 369/47.1 |

FOREIGN PATENT DOCUMENTS

| | | | |
|---|---|---|---|
| GB | 2076569 | 12/1981 | ........... G06F/11/10 |
| WO | WO9816014 | 4/1998 | ............ H03M/7/30 |

OTHER PUBLICATIONS

WO 00/34952, Van den Enden et al.*

* cited by examiner

*Primary Examiner*—Tan Dinh
*Assistant Examiner*—Jorge L. Ortiz-Criado
(74) *Attorney, Agent, or Firm*—Michael E. Belk

(57) ABSTRACT

A method and device for recording information signals on a partly recorded writable record carrier (11), e.g. an optical disc. An information signal represents at least one information unit. The record carrier has a recording track which comprises preformed track position information indicative of locations for recording the information units. From the information signal a modulated signal is generated, and the recording track is scanned for recording the modulated signal. If recording is after and adjacent an existing recorded unit, linking information is read from an end boundary area of the existing recorded unit and used for logically generating the modulated signal. If recording is before and adjacent to an existing unit, linking information is read from a begin boundary area of the existing unit and thereafter used for logically generating the modulated signal.

14 Claims, 6 Drawing Sheets

Figure 3:
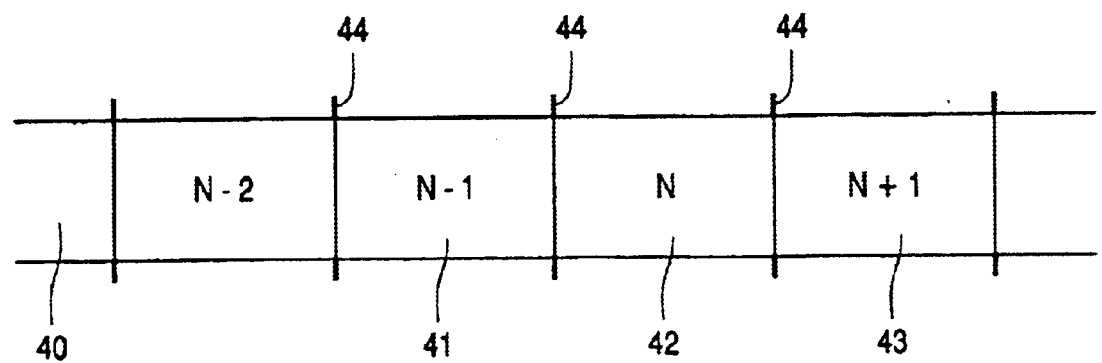

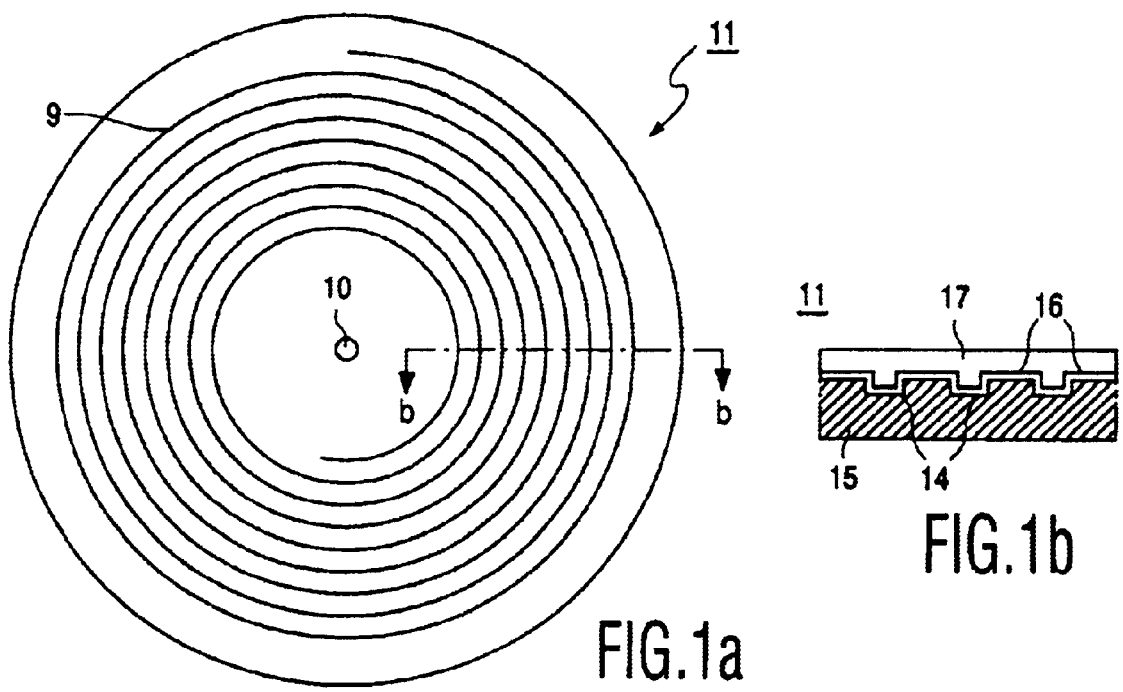
FIG.1a
FIG.1b
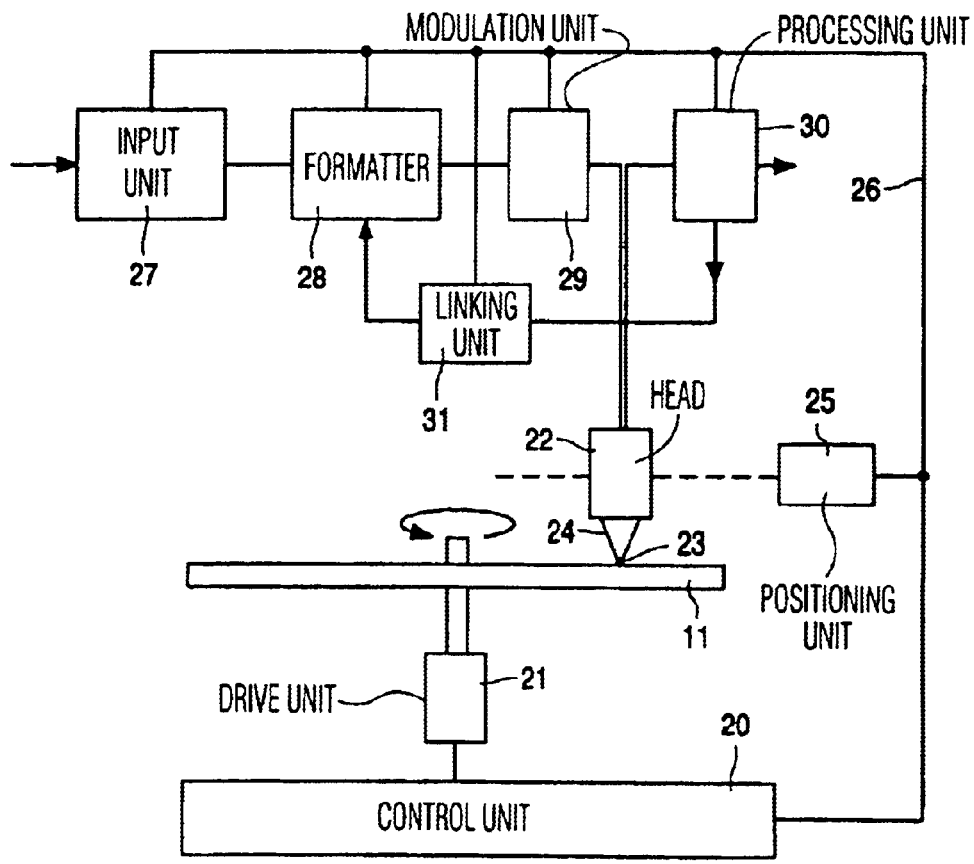
FIG. 2

METHOD AND DEVICE FOR RECORDING INFORMATION IN UNITS

The invention relates to a method of recording at least one information unit on a record carrier having a recording track which comprises preformed track position information indicative of predefined locations for recording information units and a first one of said locations comprising an earlier recorded information unit, said method comprising generating a modulated signal representing the at least one information unit, and scanning the recording track and recording the modulated signal at a second one of said locations.

The invention further relates to a device for recording at least one information unit on a record carrier having a recording track which comprises preformed track position information indicative of predefined locations for recording information units and a first one of said locations comprising an earlier recorded information unit, said device comprising: modulator means for generating a modulated signal representing the at least one information unit, and recording means for scanning the recording track and recording the modulated signal at a second one of said locations.

A method and apparatus for successively recording information units on a record carrier is known from U.S. Pat. No. 5,187,699. The information from the unit is modulated to a modulated signal and recorded in the track at predefined locations indicated by prerecorded track position information. The process of consecutively recording signals in adjacent areas in a track on the record carrier is called linking. In the known linking method, after a first modulated signal is completely recorded, the recording process is continued up to a link position after the last data byte of the information unit. When a next information signal is to be recorded, the recording process is started at the link position by recording dummy information up to the start of a following predefined location. As a result so called linking blocks are created between the first recorded signal and the second recorded signal, which linking blocks include said link position. For recording systems using error correction, like the CD system, additional error codes are included in the modulated signal. When linking, the error codes relating to the information unit recorded last may extend beyond the last data byte. To fully enable the error correction a number of run-in and run-out blocks are required as linking blocks. However, the linking blocks do not contain valid recorded information, and data storage capacity is lost.

It is an object of the invention to provide a recording method and device in which linking is more efficient.

For this purpose, the method as described in the opening paragraph is characterized in that the method comprises in the event that the second one of said locations is after and adjacent to the first one of said locations, reading linking information from an end boundary area of said first one of said locations and using the linking information for logically generating the modulated signal. Further the device as described in the opening paragraph is characterized in that the device comprises retrieving means for reading linking information from an end boundary area of the location preceding the second one of said locations, and in that the modulator means comprise linking means for using the linking information for logically generating the modulated signal in the event that the second one of said locations is after and adjacent to the first one of said locations. Reading and using the linking information has the advantage, that the modulated signal is logically generated taking into account the preceding information unit. Therefore the modulated signal directly connects to the information unit recorded earlier. Hence the number of required linking blocks can be reduced.

The invention is also based on the following recognition. Usual recording systems comprise error correction measures. Error code words are added to the data words of the information units. In particular such code words are not stored in the immediate physical vicinity of the data words but interleaved over a long part of the recording track, to allow correction of local physical errors like burst errors by undamaged error code words. However, such interleaving extends over a number of blocks. In the usual CD recordable systems a number of run-in and run-out blocks precedes and follows a recorded block. The inventors have seen that by reading the last part of the already earlier recorded blocks, and using this data to preset the error code generator in the modulator means, the number of linking blocks can be reduced. In further embodiments other linking information can be read from the boundary area to be used for logically constructing the modulated signal. It is to be noted, that just reading synchronization patterns from the earlier recorded information and using the timing of such patterns for timing the new recording process is considered physically linking for timing or synchronizing purposes. Such physical linking does not involve the logical content of the modulated signal, and hence not using linking information for logically generating the modulated signal.

An embodiment of the device is characterized in that read means are arranged for reading linking information from a begin boundary area of the location following the second one of said locations and the linking means are arranged for using the linking information for logically generating the modulated signal in the event that the second one of said locations is before and adjacent to the first one of said locations. This has the advantage, that the number of linking blocks before an earlier recorded information unit can be reduced.

A further embodiment of the device is characterized in that the recording means are arranged for recording linking information in the end boundary area after the data bytes of the at least one information unit. This has the advantage, that the linking information can be read from a limited area and can be directly used for generating the modulated signal, and does not need to be calculated based on a large section of the earlier recorded data.

Further advantageous, preferred embodiments according to the invention are given in the further dependent claims.

Figure 4A:
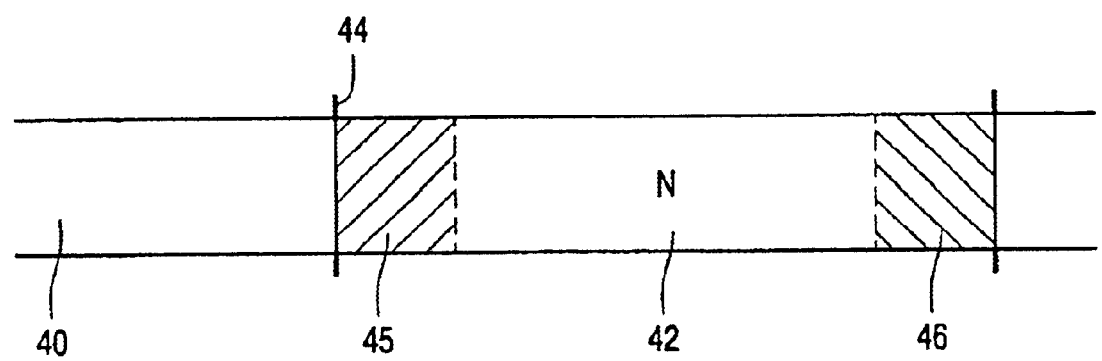
Figure 4B:
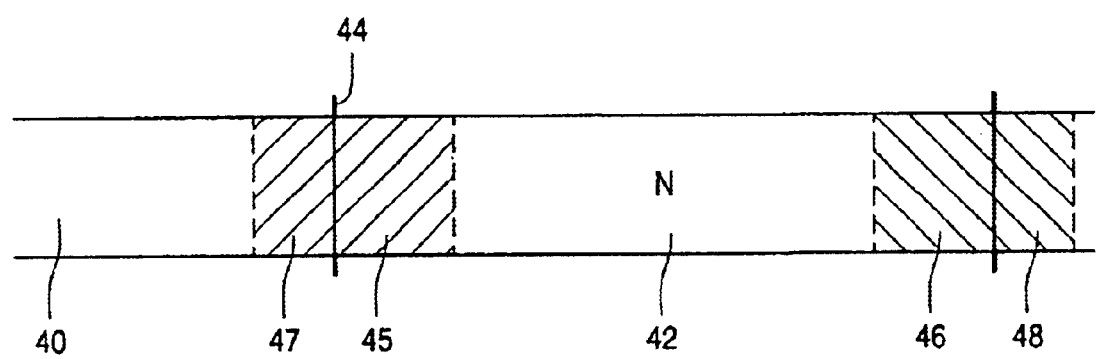
Figure 5:
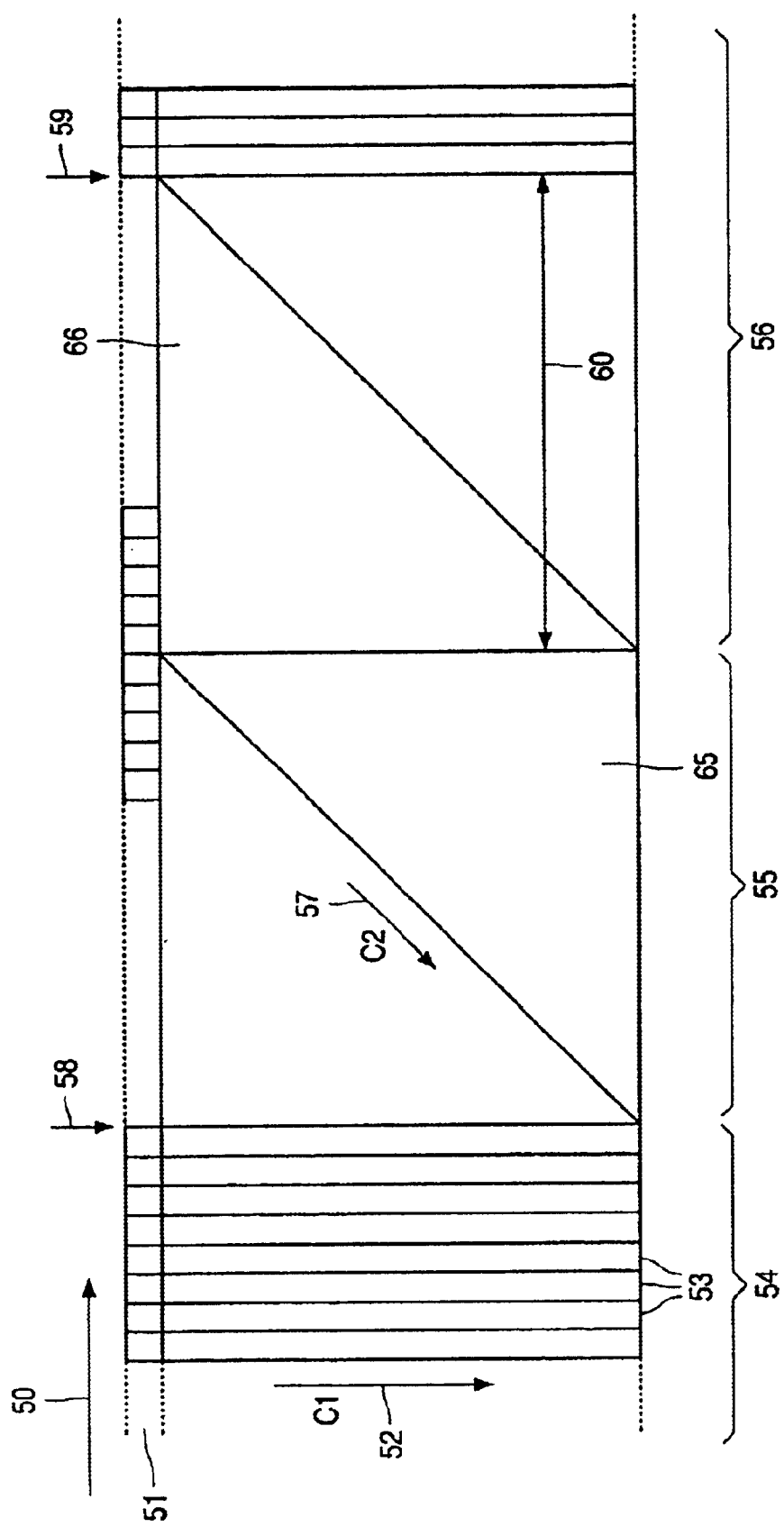
Figure 6:
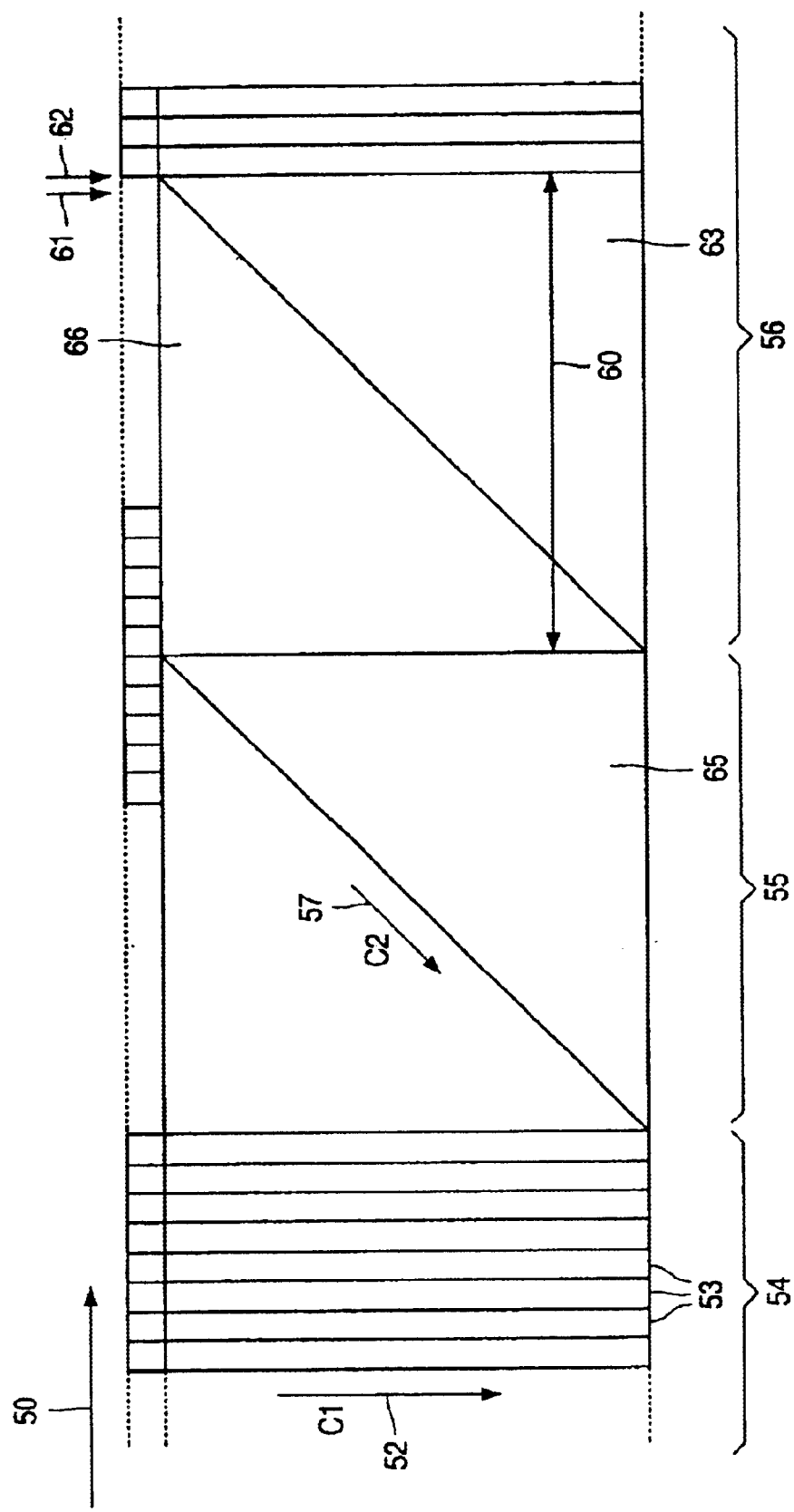
Figure 7:
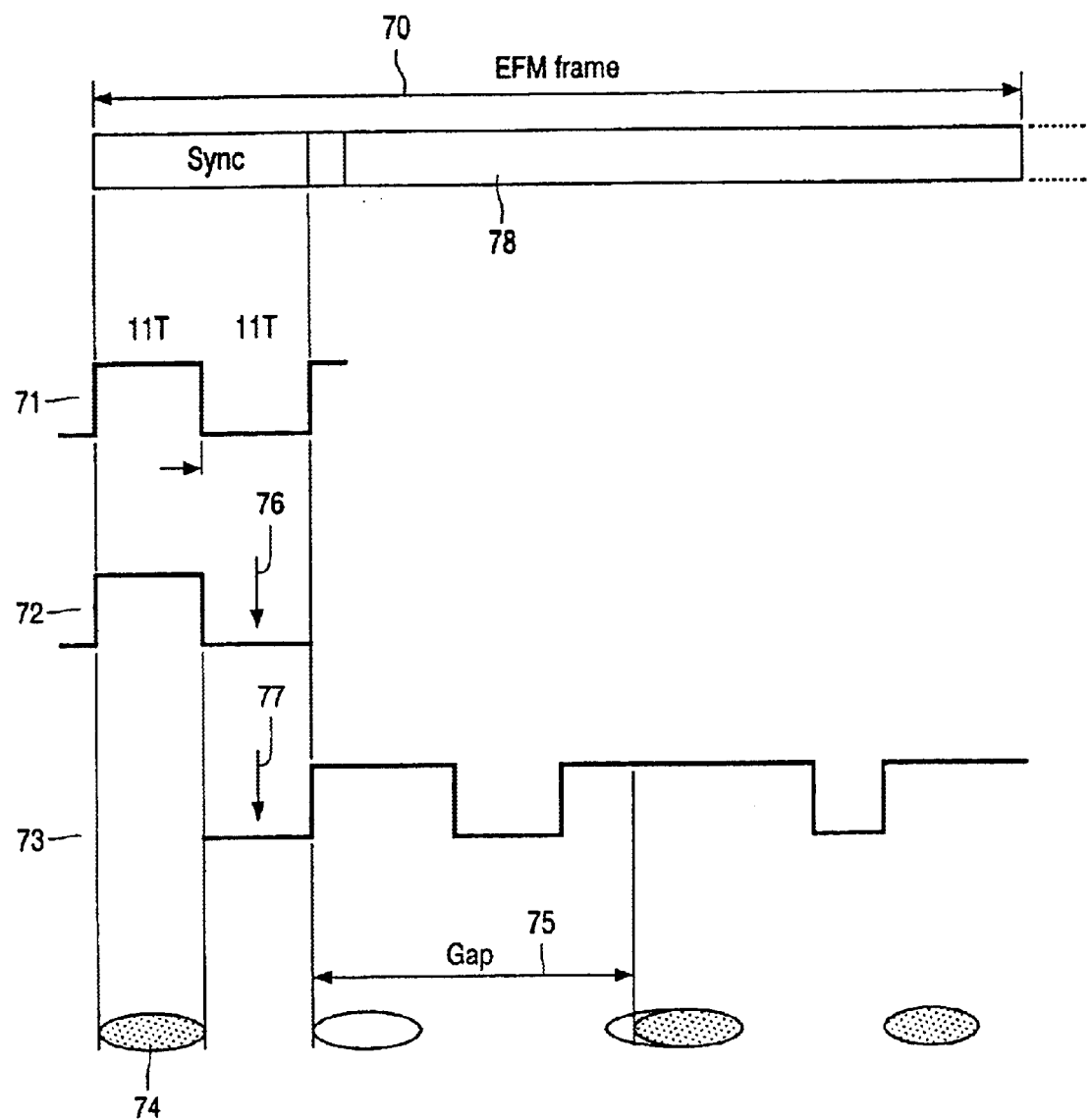
Figure 8:
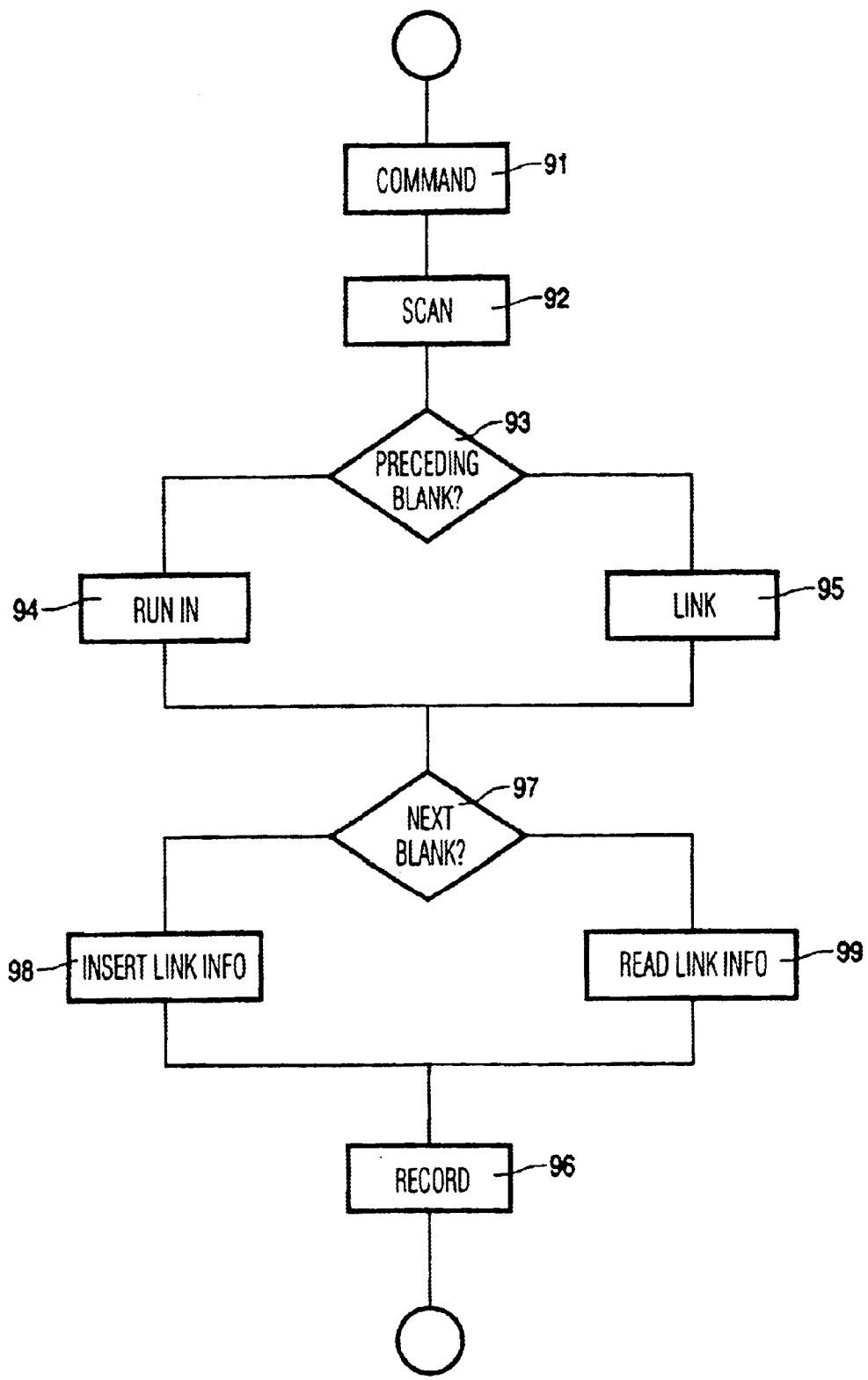

These and other aspects of the invention will be apparent from and elucidated further with reference to the embodiments described by way of example in the following description and with reference to the accompanying drawings, in which FIGS. 1 and 1*b* shows a record carrier, FIG. 2 shows a recording device, FIG. 3 shows locations for recording of information units, FIGS. 4*a* and 4*b* show begin and end boundary areas of recording locations FIG. 5 shows logically linking for recording after a recorded location, FIG. 6 shows logically linking for recording after a recorded location on a write once disc, FIG. 7 shows physically linking, FIG. 8 shows a recording method for successively recording information signals.

Corresponding elements in different Figures have identical reference numerals.

FIG. 1a shows a disc-shaped record carrier 11 having a track 9 and a central hole 10. The track 9, being the position of the series of (to be) recorded marks representing information, is arranged in accordance with a spiral pattern of turns constituting substantially parallel tracks on an information layer. The record carrier may be optically readable, called an optical disc, and has an information layer of a recordable type. Examples of a recordable disc are the CD-R and CD-RW, and writable versions of DVD, such as DVD+RW. The information is represented on the information layer by recording optically detectable marks along the track, e.g. crystalline or amorphous marks in phase change material. The track 9 on the recordable type of record carrier is indicated by a pre-embossed track structure provided during manufacture of the blank record carrier. The track structure is constituted, for example, by a pregroove 14 which enables a read/write head to follow the track during scanning. The track structure comprises position information, e.g. addresses, for indication the location of units of information, usually called blocks. The position information may include specific synchronizing marks for locating the start of such units.

FIG. 1b is a cross-section taken along the line b—b of the record carrier 11 of the recordable type, in which a transparent substrate 15 is provided with a recording layer 16 and a protective layer 17. The protective layer 17 may comprise a further substrate layer, for example as in DVD where the recording layer is at a 0.6 mm substrate and a further substrate of 0.6 mm is bonded to the back side thereof. The pregroove 14 may be implemented as an indentation or an elevation of the substrate 15 material, or as a material property deviating from its surroundings.

The record carrier 11 is intended for carrying information represented by modulated signals comprising frames. A frame is a predefined amount of data preceded by a synchronizing signal. Usually such frames also comprise error correction codes, e.g. parity words. An example of such a recording system is known from the DVD system, in which the frames carry 172 data words and 10 parity words. In the CD system error correction is effected by adding parity words and interleaving, the so called CIRC (Cross Interleaved Reed-Solomon Code) as described in GB 2076569. The first layer of error correction (called C1) corrects small local errors like random errors, and the second layer (called C2) corrects the large error such as burst errors. Further in the CD system the frames include subcode data, which subcode for example includes playing time indications and track/pause indicators.

FIG. 2 shows a recording device for writing information on a record carrier 11 of a type which is writable or re-writable, for example CD-R or CD-RW. The device is provided with recording means for scanning the track on the record carrier which means include a drive unit 21 for rotating the record carrier 11, a head 22, a positioning unit 25 for coarsely positioning the head 22 in the radial direction on the track, and a control unit 20. The head 22 comprises an optical system of a known type for generating a radiation beam 24 guided through optical elements focused to a radiation spot 23 on a track of the information layer of the record carrier. The radiation beam 24 is generated by a radiation source, e.g. a laser diode. The head further comprises (not shown) a focusing actuator for moving the focus of the radiation beam 24 along the optical axis of said beam and a tracking actuator for fine positioning of the spot 23 in a radial direction on the center of the track. The tracking actuator may comprise coils for radially moving an optical element or may alternatively be arranged for changing the angle of a reflecting element. For writing information the radiation is controlled to create optically detectable marks in the recording layer. For reading the radiation reflected by the information layer is detected by a detector of a usual type, e.g. a four-quadrant diode, in the head 22 for generating a read signal and further detector signals including a tracking error and a focusing error signal for controlling said tracking and focusing actuators. The read signal is processed by read processing unit 30 of a usual type including a demodulator, deformatter and output unit to retrieve the information. Hence retrieving means for reading information include the drive unit 21, the head 22, the positioning unit 25 and the read processing unit 30. The device comprises write processing means for processing the input information to generate a write signal to drive the head 22, which means comprise an input unit 27, and modulator means comprising a formatter 28 and a modulator 29. The control unit 20 controls the recording and retrieving of information and may be arranged for receiving commands from a user or from a host computer. The control unit 20 is connected via control lines 26, e.g. a system bus, to said input unit 27, formatter 28 and modulator 29, to the read processing unit 30, and to the drive unit 21, and the positioning unit 25. The control unit 20 comprises control circuitry, for example a microprocessor, a program memory and control gates, for performing the procedures and functions according to the invention as described below with reference to FIGS. 3 to 6. The control unit 20 may also be implemented as a state machine in logic circuits. During the writing operation, marks representing the information are formed on the record carrier. The marks may be in any optically readable form, e.g. in the form of areas with a reflection coefficient different from their surroundings, obtained when recording in materials such as dye, alloy or phase change material, or in the form of areas with a direction of magnetization different from their surroundings, obtained when recording in magneto-optical material. Writing and reading of information for recording on optical disks and usable formatting, error correcting and channel coding rules are well-known in the art, e.g. from the CD system. The marks can be formed by means of the spot 23 generated on the recording layer via the beam 24 of electromagnetic radiation, usually from a laser diode. User information is presented on the input unit 27, which may comprise of compression means for input signals such as analog audio and/or video, or digital uncompressed audio/video. Suitable compression means are described for audio in WO 98/16014-A1 (PHN 16452), and for video in the MPEG2 standard. The input unit 27 processes the audio and/or video to unit of information, which are passed to the formatter 28 for adding control data and formatting the data according to the recording format, e.g. by adding error correction codes (ECC) and/or interleaving. For computer applications units of information may be interfaced to the formatter 28 directly. The formatted data from the output of the formatter 28 is passed to the modulation unit 29, which comprises for example a channel coder, for generating a modulated signal which drives the head 22. Further the modulation unit 29 comprises synchronizing means for including synchronizing patterns in the modulated signal. The formatted units presented to the input of the modulation unit 29 comprise address information and are written to corresponding addressable locations on the record carrier under the control of control unit 20. The linking information is coupled to a linking unit 31, which linking unit is coupled to the formatter 28 for controlling the generation of the modulated signal. According to the invention the control unit 20 of the recording device and the linking unit 31 as shown in FIG. 2 are arranged for logically arranging the information to be recorded according to the methods described below with reference to the FIGS. 3 to 6. Thereto the control unit 20 is arranged for reading linking information via the read processing unit 30 from the record carrier and controlling the linking unit 31 for generating the modulated signal according to the logically arranged information.

FIG. 3 shows schematically locations for recording information units in a track. The track 40 and consecutive locations 41,42,43 for recording information units N−1, N and N+1 are schematically indicated. Block boundaries 44 are indicated by vertical lines. In actual recording systems like the CD system block boundaries may be spread over a substantial part of the track due to interleaving data of different blocks. In such systems the block boundary indicates the first byte of a new data block, whereas a last part of the bytes of the previous block may be physically located after this boundary.

FIGS. 4*a* and 4*b* show begin and end boundary areas of recording locations. A boundary area is the part of the track which holds linking information, i.e. information logically shared or influenced by the current block and also by the previous or next data block. For example the linking information comprises error code words which relate to neighboring blocks, like the CIRC error code words. Notably the linking information may only be that part of the already recorded block that influences the logical contents of the following block, e.g. the last part of a block including the related error symbols and address data from the header. In an embodiment the linking information may include additionally recorded information, e.g. after the end of the existing preceding block or before the start of an existing block. In an embodiment the additionally recorded information comprises preset information sufficient for presetting an error encoder. This is advantageous in that only the additionally recorded information needs to be read instead of a number of preceding blocks which usually contain all data symbols needed for (after calculation) obtaining the same preset data for the error encoder. Further, when adding the preset information to the additional linking information, small amounts of data may be recorded, which are shorter then the minimum amount of data symbols required in the error encoder. In an embodiment the linking information may comprise auxiliary recording information, like addresses or subcode information in the CD system. The CD subcode inter alia holds playing time information and track/pause information. For a first embodiment as shown in FIG. 4*a*, block N has within the block boundaries 44 a begin boundary area 45 and an end boundary area 46. For a second embodiment as shown in FIG. 4*b*, block N has also linking information outside the block boundaries 44. The begin boundary area 45 extends with a run-in part 47 before the block boundary, which may apply to the situation that the previous area is not written. The end boundary area 46 extends with a run-out part 48 beyond the block boundary, which may apply to the situation that the next area is not written. Preferably the run-in and/or run-out blocks are used to additionally store linking information for enabling easy linking when at a later moment the area neighboring to the written block is to be recorded, as described below. In the following text the writing and linking of one block (N) in the CD system is described, but alternatively a series of blocks may be written at once, and then the linking applies to the begin of the first block and the end of the last block. The following situations involve linking.

In a first case the preceding block N−1 has been written before. Then the begin part of new block N is to be linked to the existing recorded data, which is usually called appending data. First the end boundary area 46 is read, and the linking information is extracted. Using the linking information the modulated signal can be generated, for example by presetting the CIRC error encoder based on the relevant data bytes of the previous block and then start encoding the new data. The read/write head 22 is jumped back and again scans the block N−1 up to the block boundary 44. At that moment the recording is started using the modulated signal. The generation of the modulated signal may be effected during the recording action or the modulated signal may be generated beforehand. In an embodiment of a re-writable system like CD-RW, the end boundary area extends beyond the block boundary, e.g. two blocks with linking information and some data from block N−1 constitute the boundary area. The extending part 48, e.g. said two blocks, is overwritten by the newly generated modulated signal. After such a link no linking blocks remain. In an embodiment of a write-once system like CD-R, the end boundary area extends beyond the block boundary, e.g. two blocks with linking information and some data from block N−1 constitute the boundary area. The extending part 48, e.g. said two blocks, cannot be overwritten, so writing starts directly thereafter. When reading the linking area the full status of the error decoder at the end of said extending part 48 is known. Using this known state the writing of block N can start without further linking blocks by presetting the error encoder to this known state. Some fixed data may be used to fill data locations in the begin boundary area which are part of the preceding block due to interleaving. After such a link the minimum number of linking blocks remain, and no errors are present in the recorded data.

In a second case the following block N+1 has been written before. Then the end part of new block N is to be linked to the existing recorded data. First the begin boundary area 45 of block N+1 is read, and the linking information is extracted. Then the read/write head 22 is jumped back and scans the block N−1 up to the block boundary 44. At that moment the recording is started using the modulated signal, or earlier when a run in part is required like extending boundary area 47. Using the linking information the modulated signal for the last part of the recording can be generated, for example by supplying to the CIRC error encoder (after the last data byte of block N) the first data bytes of the next block N+1. In an embodiment of a re-writable system like CD-RW, the begin boundary area extends beyond the block boundary, the extending part 47 is overwritten by the newly generated modulated signal. The last blocks thus generated may also overwrite the begin boundary area 45 of block N+1. After such a link no linking blocks remain. In an embodiment of a write-once system like CD-R, the begin boundary area 45 obviously cannot be overwritten. Hence the begin boundary area of block N+1 will remain unchanged. The preceding end boundary area of new block N is generated by using the linking information of said begin boundary area 45 so as to minimize the number of linking blocks and linking defects, e.g. the number of errors detected by the error decoder is minimized by presetting the error encoder when encoding the last block written. For example said begin boundary area 45 has a fixed content (e.g. all zeroes) and also the end boundary area of block N has a fixed content (e.g. all zeroes) and the corresponding error code words in both boundary areas are known also, and when reading the linking area a data block of fixed content (all zeroes) and no errors are detected. It is noted that when writing data up an existing data block, as in the case of writing up to block N+1, the timing for the writing clock must be accurately controlled so as to exactly fill the area up the start of said existing next block. The exact location of said start is detected when reading the linking information, for example with respect to the servo pattern. During writing the write clock is controlled accurately, e.g. by again using the servo pattern like the track wobble on the recordable CD-RW.

In a third case the preceding block N−1 and the following block N+1 have been written before. Of course also block N may have been written before, in which case the writing of block N is usually called replacing data. Both preceding cases are now combined and applied at the begin and the end of block N respectively. Further for fitting in block N the length of the area between blocks N−1 and N+1 is detected when reading the linking information and the write clock is controlled to exactly fill said area. When replacing an existing block N (only possible in a rewritable system) said existing block N is also read for deriving linking information, because due to interleaving this block usually holds also data and error code words relating to blocks N−1 and N+1.

FIG. 5 shows logically linking for recording after a recorded location in more detail for a re-writable system, like CD-RW. The track direction as scanned in time is indicated by arrow 50. Drawn in the vertical direction data frames 53, in the CD system called EFM frames, are to be recorded consecutively, each data frame preceded by a frame header, like CD subcode, and including error code words, like the C1 code words from the CD CIRC encoder as indicated by arrow 52. In the CD system 109 of such data frames constitute a block. Further additional error code words may be included or distributed over several frames, like the C2 code words as indicated by arrow 57. The first part 54 of the track has the last complete data frames of block N−1. The second part 55 of the track contains (in the upper triangle) the remaining data bytes of block N−1 (due to the interleaving used in the CD system). The lower triangle contains linking information 65, for example the values of the CIRC error encoder at the accurate linking point 58. A second block, indicated by arrow 60, including further linking information 66, may be required, before at the stop recording point 59 the recording of block N−1 is terminated. For example, the second block 60 may contain error codes for correcting the last data bytes in the first block 55. When the new block N has to be recorded, first the linking information 65,66 should be retrieved from the end boundary area of block N−1, i.e. from the blocks 55 and 60. The writing of new data may be started at the accurate linking point 58 without recording any linking information. A true seamless link results, equal to recording a series of blocks without interruption. Alternatively, the linking information may be generated anew taking into account the data bytes of blocks N−1 and N, and recorded anew in blocks 55 and 60 starting at the accurate linking point 58. Alternatively the new linking information may be concentrated in the second block 60, so that new data is recorded starting at the second block, as indicated by brace 56. In the last two cases linking information remains available for new linking actions. This may be an advantage, e.g. for a solution compatible with write-once systems like CD-R.

FIG. 6 shows logically linking for recording after a recorded location on a write once disc. Most elements shown are similar to FIG. 5. However, the accurate linking point 62 is now located after the second block 60, and after the stop recording point 61. Of course the intermediate blocks 55 and 60 containing the linking information cannot be recorded anew in the write-once system. The second block 60 contains the error codes for fully error correcting the last data bytes in the first block 55. Preferably the stop recording point 61 is shortly after the last error code word needed to error protect the last data bytes of block N−1. Alternatively recording is stopped earlier, e.g. after the last frame of block 55, but then the error correcting function cannot be fully effected for block N−1. In an embodiment the lower triangle 63 in the second block 60 contains dummy data bytes of a fixed value, e.g. 00, to allow the error encoder and interleaving pipelines to be preset to a known value at the accurate linking point 62. In that case no or only limited reading of the linking data is needed before recording block N. The amount of storage space used for linking is about 1,5 blocks, in practice probably 2 blocks because the second half block of block N cannot be easily used because the first half contains the dummy data.

FIG. 7 shows physically linking. It is to be noted, that logically linking as described above with reference to FIGS. 4, 5 and 6 relates to the formatting of blocks. The start and stop of recording of the marks representing the bits of information in the track is called physical linking. Suitable physical linking is achieved in longer marks, for example in EFM synchronisation marks, as indicated in U.S. Pat. No. 5,463,607 (column 6, lines 48–59). In FIG. 7 the EFM frame 70 starts with a Sync and thereafter follow data bytes and error codes (also called parity symbols). The sync 71 contains a pit of 11T and a land of 11T, T being the length of a channel bit. At a first recording session 72 writing is stopped at the arrow 76. At a second recording session 73 recording is started at arrow 77. Due to the start-up of the laser power control circuit a small gap 75 may occur, during which pit are not formed as required. The gap 75 should be made as small as possible by using a laser power control circuit which can start quickly. When reading the linking area, the existing error correcting system will usually correct such a minor error caused by the gap.

FIG. 8 shows a recording method for successively recording information signals. It is assumed that a record carrier of a writable type is inserted in a recording device and that it already contains some recorded information. In a first step 91 (COMMAND) a command is received to record block N. In a second step 92 (SCAN) the track on the record carrier is scanned up to the preceding location of block N−1. In a first test 93 (PRECEDING BLANK) it is decided, if this preceding location is not blank (i.e. contains already some information signal). If not blank, in a step 95 (LINK) a linking is performed as described above with reference to FIG. 5 or 6. If no information signal is present on the preceding location, in a step 94 (RUN-IN) a sequence of dummy data is prepared to be recorded before the start of location N to enable a read circuit to lock to the data, adding in the begin boundary area of block N linking information as described with reference to FIG. 4. In second test 97 (NEXT BLANK) the status of the location N+1 after block N is determined. In the event that the next location N+1 contains a valid information signal, linking information is retrieved in a step 99 (READ LINK INFO) and used for generating the modulated signal. In the event that the next location is blank, in step 98 (INSERT LINK INFO) link information is added to the end boundary part of the modulated signal of block N. In step 96 after said steps 98 or 99 the actual modulated signal of block N is recorded, and thereafter a next command may be awaited.

Although the invention has been explained by embodiments using the CD optical recording format, it may be applied for any format for recording units of information, wherein the units share data, e.g. error correcting symbols or interleaving. For example the record carrier may also be a magnetic type disc or a tape. It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' may be represented by the same item of hardware. Further, the scope of the invention is not limited to the embodiments, and the invention lies in each and every novel feature or combination of features described above.

What is claimed is:

1. Method of recording at least one information unit on a record carrier having a recording track which comprises preformed track position information indicative of predefined locations for recording information units and a first one of said locations comprising an earlier recorded information unit, said method comprising:
   (a) generating a modulated signal representing the at least one information unit, and
   (b) scanning the recording track and recording the modulated signal at a second one of said locations, characterized in that the method comprises:
   (c) in the event that the second one of said locations is after and adjacent to the first one of said locations, reading linking information from an end boundary area of said first one of said locations and using the linking information other than synchronization information for logically generating contents of the modulated signal.

2. Method as claimed in claim 1, wherein the method comprises:
   (d) in the event that the second one of said locations is before and adjacent to the first one of said locations, reading linking information from a begin boundary area of said first one of said locations and using the linking information for logically generating the modulated signal.

3. Method as claimed in claim 1, wherein the linking information comprises a last part of the earlier recorded information unit for presetting an error encoder.

4. Method as claimed in claim 2, wherein the linking information comprises a first part of the earlier recorded information unit for, after writing the modulated signal generating an additional modulated signal representing said first part and error correction words based on the at least one information unit and said first part, and recording the additional modulated signal in the begin boundary area.

5. Method as claimed in claim 1, wherein the linking information comprises additional recording information, in particular CD subcode.

6. Method as claimed in claim 1, wherein linking information is additionally recorded in the end boundary area after the data bytes of the at least one information unit.

7. Method as claimed in claim 6, wherein the earlier recorded information unit is terminated by an end boundary area comprising said additionally recorded linking information, and the recording of the modulated signal starts by overwriting the end boundary area, or wherein said record carrier is of a write once type and the linking information includes dummy data bytes of a predefined value for allowing presetting an error encoder when recording a consecutive information unit.

8. Device for recording at least one information unit on a record carrier (11) having a recording track (9) which comprises preformed track position information indicative of predefined locations for recording information units and a first one of said locations comprising an earlier recorded information unit, said device comprising:
   modular means (29) for generating a modulated signal representing the at least one information unit, and
   recording means (22) for scanning the recording track and recording the modulated signal at a second one of said locations,
   characterized in that the device comprises retrieving means (20, 30) for reading linking information from an end boundary area of the location preceding the second one of said locations and in that the modulator means comprise linking means (31) for using the linking information other than synchronization information for logically generating contents of the modulated signal in the event that the second one of said locations is after and adjacent to the first one said locations.

9. Device as claimed in claim 8, wherein the retrieving (20, 30) means are arranged for reading linking information from a begin boundary area of the location following the second one of said locations and the linking means (31) are arranged for using the linking information for logically generating the modulated signal in the event that the second one of said locations is before and adjacent to the first one of said locations.

10. Device as claimed in claim 8, wherein the recording means (22) are arranged for additionally recording linking information in the end boundary area after the data bytes of the at least one information unit.

11. Device as claimed in claim 8, wherein the retrieving means further comprises the linking information comprises a first part of the earlier recorded information unit for, after writing the modulated signal, generating an additional modulated signal representing said first part and error correction words based on the at least one information unit and said first part, and recording the additional modulated signal in the begin boundary area.

12. Device as claimed in claim 8, wherein the retrieving means further comprises the linking information assisting in recording additional information.

13. Device as claimed in claim 8, wherein linking information is additionally recorded in the end boundary area after the data bytes of the at least one information unit.

14. Device as claimed in claim 8, wherein the earlier recorded information unit is terminated by an end boundary area comprising said additionally recorded linking information, and the recording of the modulated signal starts by overwriting the end boundary area, or wherein said record carrier is of a write once type and the linking information includes dummy data bytes of a predefined value for allowing presetting an error encoder when recording a consecutive information unit.

* * * * *